United States Patent
Hertzmann et al.

(10) Patent No.: US 6,628,282 B1
(45) Date of Patent: Sep. 30, 2003

(54) STATELESS REMOTE ENVIRONMENT NAVIGATION

(75) Inventors: Aaron Hertzmann, New York, NY (US); Henning Biermann, New York, NY (US); Jon Meyer, Brooklyn, NY (US); Kenneth Perlin, New York, NY (US)

(73) Assignee: New York University, New York, NY (US)

( * ) Notice: Subject to any disclaimer, the term of this patent is extended or adjusted under 35 U.S.C. 154(b) by 0 days.

(21) Appl. No.: 09/425,772

(22) Filed: Oct. 22, 1999

(51) Int. Cl.$^7$ .............................................. G06T 15/10
(52) U.S. Cl. ...................... 345/427; 345/502
(58) Field of Search ................................. 345/427, 418, 345/419, 355, 475, 502, 503; 364/514; 382/284

(56) References Cited

U.S. PATENT DOCUMENTS

| | | | |
|---|---|---|---|
| 5,850,352 A | * 12/1998 | Moezzi et al. | 345/419 |
| 5,880,733 A | * 3/1999 | Horvitz et al. | 345/850 |
| 6,020,931 A | * 2/2000 | Bilbrey et al. | 345/584 |
| 6,081,271 A | * 6/2000 | Bardon et al. | 345/419 |
| 6,097,393 A | * 8/2000 | Prouty, IV et al. | 345/419 |
| 6,104,406 A | * 8/2000 | Berry et al. | 345/427 |
| 6,166,738 A | * 12/2000 | Robertson et al. | 345/839 |

OTHER PUBLICATIONS

Avidan, Shai, Amnon, Shashua, "Novel View Synthesis in Tensor Space", *IEEE Computer Vision and Pattern Recognition*, Jun. 1997.

Burt, Peter J., Adelson, Edward H., "The Laplacian Pyramid as a Compact Image Code", *IEEE Transactions on Communications*, 31(4):532–540, Apr. 1983.

Chang, E.C., Yap, C.K., Yen, T.J., "Realtime Visualization of Large Images over a Thinwire", *IEEE Visualization 97* (*Late Breaking Hot Topics*), Tuscon, Ar, 1997.

Shenchang E. Chen, Lance Williams, "View Interpolation for Image Synthesis", *ACM SIGGRAPH '93*, Aug. 1993, pp. 279–288.

Shenchang Eric Chen, "QuickTime® VR—An Image–Based Approach to Virtual Environment Navigation", *ACM SIGGRAPH '95*, Aug. 1995, pp. 29–38.

Conner, Brook, Holden, Loring, "Providing A Low Latency User Experience In A High Latency Application", *ACM Symposium on Interactive 3D Graphics*, Providence, RI, 1997, pp. 45–48.

Darsa, Lucia, Silva, Bruno Costa, Varshney, Amitabh, "Navigating Static Environments Using Image–Space Simplification and Morphing", *ACM Symposium on Interactive 3D Graphics*, Providence, RI, 1997, pp. 25–34.

(List continued on next page.)

Primary Examiner—Mark Zimmerman
Assistant Examiner—Huedung X. Cao
(74) Attorney, Agent, or Firm—Ansel M. Schwartz

(57) ABSTRACT

A system for viewing a scene from a remote location. The system includes a client machine. The system includes a network connected to the client machine. The system includes a server machine having a 3D environment stored in it. The server machine is connected to the network and remote from the client machine, wherein the client machine predicts a next view of the 3D environment based on a previous view of the 3D environment by the client machine, and the server machine predicts the next view also based on the previous view and sends to the client machine by way of the network only the difference between the predicted view and the previous view. Methods for viewing a scene from a remote location.

11 Claims, 8 Drawing Sheets

OTHER PUBLICATIONS

McMillan, Leonard, Bishop Gary, "Plenoptic Modeling: An Image–Based Rendering System", *SIGGRAPH '95*, (Aug. 95), pp. 39–46.

Kang, Sing Bing, "A Survey of Image–based Rendering Techniques", *Technical Report 97/4*, Digital Equipment Corporation Cambridge Research Laboratory, Aug. 1997.

Levoy, Marc, "Polygon–Assisted JPEG and MPEG Compression of Synthetic Images", *SIGGRAPH '95*, http://graphics.
Stanford.edu/papers/poly, Aug. 6–11, 1995, pp. 21–28.

Mann, Yair, Cohen–Or, Daniel, "Selective Pixel Transmission for Navigating in Remote Virtual Environments", *EUROGRAPHICS '97*, vol. 16, (1997), No. 3, pp. C201–C206.

Mark, William R., McMillan, Leonard, Bishop, Gary, "Post–Rendering 3D Warping", *In Proceedings of the 1997 Symposium on Interactive 3D Graphics*(Providence, RI), Apr. 27–30, 1997, pp. 7–16.

Rafferty, Matthew M., Aliaga, Daniel G. Lastra, Anselmo A., "3D Image Warping in Architectural Walkthroughs", Appeared: *VRAIS '98*, pp. 228–233, Mar. 14–18, 1998.

Regan, Matthew, Pose, Ronald, "Priority Rendering with a Virtual Reality Address Recalculation Pipeline", *Computer Graphics Proceedings (SIGGRAPH 94)*, 1994, pp. 155–162.

Shade, Jonathan, Lischinski, Dani, Salesin, David H., DeRose, Tony, Snyder, John, "Hierarchical Image Caching for Accelerated Walkthroughs of Complex Environments", *SIGGRAPH 96*, pp. 75–82.

Sillion, Francois, Drettakis, George, Bodelet, Benoit, "Efficient Imposter Manipulation for Real–Time Visualization of Urban Scenery", *EUROGRAPHICS '97*, vol. 16, (1997), No. 3, pp. 207–218.

Sweldens, Wim, "The Lifting Scheme: A Custom–Design Construction of Biorthogonal Wavelets", *Technical Paper*, 1994:7, Industrial Mathematics Initiative, Department of Mathematics, University of South Carolina, 1994.

Torborg, Jay, Kajiya, James T., "Talisman: Commodity Realtime 3D Graphics for the PC", *Computer Graphics Proceedings (SIGGRAPH 96)*, 1996, pp. 353–363.

\* cited by examiner

STATELESS REMOTE ENVIRONMENT NAVIGATION

FIELD OF THE INVENTION

The present invention is related to the viewing a scene of a 3D environment stored in a server machine from a client machine at a location remote from the server machine. More specifically, the present invention relates to viewing a scene of a 3D environment stored in a server machine from a client machine remote from the server machine where the client machine uses previous views of the scene to predict a next view and the server machine sends only a difference between the predicted view and the next view to the client machine for the client machine to form the next few.

BACKGROUND OF THE INVENTION

The steadily increase of computing power promises a wide variety of compelling multimedia experiences for users in the next decade. One often-stated goal is the development of shared virtual worlds and entertainment broadcasts that allow consumers to remotely explore 3D spaces. However, the speed of the Internet and other broadcast media cannot keep up with the demand for available bandwidth, if thousands of users are to have high-fidelity access to remote worlds. To address this issue, the present invention presents a class of compression schemes designed to significantly reduce the bandwidth required for remote navigation.

In a typical setup, amuser explores a virtual world on a client machine. This machine requests views of the world from a server machine. Sending the entire model over the network in advance is extremely slow, or impossible for dynamic scenes; one solution is to send each camera view from the server to the client for each frame as a compressed image. This solution will still require high network bandwidth to display video at interactive frame rates.

The present invention presents a novel compression scheme that predicts the appearance of new views from previous views, using the known camera motion and image-based rendering techniques. This allows the server to send only incremental amounts of information for each frame, greatly reducing the bandwidth required for remote navigation. Unlike most image compression schemes, this method is cooperative: the client and server can communicate to determine the data for the server to send to the client in each frame that maximizes quality of service for a given available bandwidth.

It is assumed that available network resources in the coming decade will lag far behind increasing processor power, and will be the limiting factor on navigation frame rates. Thus, some additional computation required for each frame is acceptable.

The present invention is based on image-based rendering, in which images are used as primitives rather than 3D models. (See [Sing Bing Kang. A Survey of Image-based Rendering Techniques. Technical Report 97/4. Digital Equipment Corporation Cambridge Research Laboratory, August 1997, incorporated by reference herein] for a survey.) Many authors have described image-based techniques for utilizing temporal coherence to reduce rendering latency; for example, see [Shenchang Eric Chen, Lance Williams, View Interpolation for Image Synthesis. *SIGGRAPH* 93, August 1993, p279–288]; Shenchang Eric Chen. QuickTime VR—an image-based approach to virtual environment mapping. *SIGGRAPH* 95, August 1995, p29–38]; Jay Torborg, Jim Kajiya. Talisman: Commodity Realtime 3D Graphics for the PC, *SIGGRAPH* 96, 1996, p353–363]; Jonathan Shade, Dani Lischinski, David Salesin, Tony DeRose, John Snyder. Hierarchical Image Caching for Accelerated Walkthroughs of Complex Environments. *SIGGRAPH* 96, p75–82]; Lucia Darsa, Bruno Costa, and Amitabh Varshney, Navigating Static Environments Using Image-Space Simplification and Morphing. *ACM Symposium on Interactive 3D Graphics*, Providence, R.I., 1997, pp. 25–34; Francois Sillion, George Drettakis, and Benoit Bodelet. Efficient Impostor Manipulation for Real-Time Visualization of Urban Scenery. Computer Graphics Forum (Proc. of Eurographics '97). September, 1997. p207–218, all of which are incorporated by reference herein]. Regan and Pose [Matthew Regan, Ronald Pose. Priority Rendering with a Virtual Reality Address Recalculation Pipeline. *Computer Graphics (SIGGRAPH 94 Conference Proceedings).* 1994, incorporated by reference herein] use an image-based approach to overcome high network latencies. In these systems, reference images are generated and sent to the client system. The client then reprojects these images to generate new views at interactive rates until the next set of reference images arrive. [Brook Conner and Loring Holden. Providing a Low Latency User Experience In a High Latency Application *ACM Symposium on Interactive 3D Graphics*, Providence, R.I., 1997, pp. 45–48, incorporated by reference herein] discusses techniques for hiding the effects of latency in a shared world. These methods are complementary to the approach of the present invention, since they address latency rather than bandwidth.

Two commercial products, Apple QuickTime VR 3.0 [Apple Computer, Inc., QuickTime VR 3.0. http://www.apple.com/quicktime, incorporated by reference herein] and LivePicture ImageServer [Live Picture, Inc., http://www.livepicture.com/, incorporated by reference herein] send panoramas over the network in pieces, so that the client may view the scene without having to receive the entire panorama. However, a large portion of the panorama must be downloaded before much viewing can begin. Also, these systems are not easily extensible to handle dynamic imagery or camera translations.

The approach presented in the present invention is an image-compression scheme, based on specialized a prior knowledge about the images. Compare, for example, the multiscale compression schemes [Peter Burt, Edward Adelson. The laplacian pyramid as a compact image code. *IEEE Transactions on Communications*, 31(4):532–540, April 1983, incorporated by reference herein] and [Wim Sweldens. The lifting scheme: A custom-design construction of biorthogonal wavelets. Technical Paper 1994:7, Industrial Mathematics Initiative, Department of Mathematics, University of South Carolina, 1994, incorporated by reference herein] , which use prediction and difference. This work is designed for a cooperative client-server approach, similar to [Marc Levoy. Polygon-Assisted JPEG and MPEG Compression of Synthetic Images. *SIGGRAPH* 95, (August 95), p21–28, incorporated by reference herein]. The MPEG compression scheme [D. Le Gall, MPEG: A Video Compression Standard for Multimedia Application. *Communications of the ACM*, Vol. 34, No. 4, April 1991, p46–58, incorporated by reference herein] uses optical flow to predict video frames, for replaying prerecorded video. Chang et al. [Ee-chien Chang, Chee Yap, T. J. Yen. Realtime Visualization of Large Images over a Thinwire. *IEEE Visualization* '97 (Late Breaking Hot Topics). Tucson, Ariz., 1997, incorporated by reference herein] use foveation, a spatially-varying compression scheme for remote viewing of very large 2D images. This is a generalization of wavelets, that allows an image to be displayed at different resolutions at different locations. In this system, the server sends only the image coefficients necessary to update the view of a static, 2D space.

A panorama viewer (such as QuickTime VR) takes a source image or "environment map", projects it into view space using a view transform (for example, using a cylindrical or spheric projection), and then displays this projected image on the screen. This technique can be used to create an impression of a navigable 3D environment. Most panorama viewers assume a fixed camera position, and navigation is performed using a combination of rotations and scales. Translations are done by jumping from one panorama to another. For example, LivePicture [Live Picture, Inc., http://www.livepicture.com/, incorporated by reference herein] has created nested panoramas, allowing the user to zoom in and be transferred from one panorama to another.

Source images for panorama viewers can become very large. For example, in our application, the test panorama image is 1240×380 pixels. These images are too large to be conveniently transmitted over the Internet. Consequently, distributed (client-server) implementations of a panorama viewers are being developed.

There are several approaches to implement a network based panorama viewer. Four approaches are outlined below:
1. Model-based, no caching (e.g. QuickTime VR):
   server transmits entire source panorama image to client
   client computes projected views from this image and displays them
2. View-based, no caching:
   when view changes, client tells server its view position,
   server computes view image and transmits it to client.
   client displays resulting image
3. Model-based, cached:
   when view changes, client tells server new view position, and old view position(s) (or the server may cache information about prior views).
   server determines which parts of original (unprojected) panorama image client does not have, and transmits those parts to client.
   client composes new image parts with existing image parts to create a partial (unprojected) panorama image, then projects this image to create displayed image.
4. View-based, cached:
   when view changes, client tells server new view position and old view position.
   server creates projected images of panorama using the old and new views, and sends enough difference information to client for client to be able to construct an image of new view.
   client creates new view by applying a transform to its old view, and then merging in difference information from server.

Approaches 1 and 2 do not scale well to large panoramas or low-bandwidth networks.

Approach 3 has not been explored for panoramas, and would be of interest. There are systems which allow the user to view a large image over a thinwire (e.g. [Chang, E., Yap, C., Yen, T. J., Realtime Visualization of Large Images over a Thinwire, IEEE Visualization 97 (Late Breaking Hot Topics), Tuscon, Ari., 1997, incorporated by reference herein]), which could be adapted for use in approach 3. The common theme is that the client builds on its existing knowledge of the source image, instructing the server on what areas of the panorama image to send according to user interactions. This technique works well in a state-based communication protocol where the client and the server both have knowledge of the underlying data representation used for the panorama image. One advantage of this approach is that the source image can be pre-processed and compressed heavily before communications is initiated, so very low bandwidth can be achieved. Another advantage is that the caching strategies involved are well understood.

However, in some cases, it is undesirable to transmit the original source image data over the net. For example, if the source data is very high resolution (perhaps stored in a database) then there may not be enough memory in the client to store the original source data. Also, in some cases, the data representation of the source image may not be suitable for transmitting over the net—for example, if the image represents a dynamic scene or complex 3D model. Finally, if the source data requires sophisticated rendering hardware, it may be desirable to perform the rendering on the server rather than the client, and utilize a high-performance graphics server.

For these scenarios, it is worthwhile to examine approach 4, which involves transmitting the view projected version of the source data, rather than the original source representation. This provides a clean separation between the view image that is seen remotely and the internal representation of the source data, and therefore it can scale to extremely large, complex or dynamic scenes. The approach is conceptually very simple, and a basic implementation is more straight-forward than for approach 3, which requires careful thought about bookkeeping and caching strategies for panoramas. The system of the present invention uses approach 4.

One drawback to approach 4 is that, at first glance, it requires a great deal of network bandwidth to transmit the rendered scene to the client each frame. However, by utilizing frame-to-frame coherence, image reprojection, and compression, bandwidth requirements can be reduced significantly, making the approach viable for moderate bandwidth low-latency networks.

Image composition and morphine are well established as techniques for utilizing temporal coherence. See [R. Cook, Shade Trees, ACM SIGGRAPH '84, July 1984, p223–231, incorporated by reference herein], [Shenchang E. Chen, QuickTime VR—an image based approach to virtual environment mapping, ACM SIGGRAPH '95, August 1995, pp29–38, incorporated by reference herein]. Talisman [J. Toyborg, J. Kajiya, Talisman: Commodity Realtime 3D Graphics for the PC, SIGGRAPH '95, (August 1995), pp. 39–46, incorporated by reference herein] is an example of a real time 3D graphics architecture that combines geometric and image-based methods, and uses a similar image coherence technique to reduce system bus bandwidth. [Jonathan Shade, Dani Lischinski, David Salesin, Tony DeRose, John Snyder. "Hierarchical Image Caching for Accelerated Walk-throughs of Complex Environments." SIGGRAPH 96. p.75–82, incorporated by reference herein] is another hybrid approach that uses temporal coherence to improve overall system performance.

The system of the present invention utilizes image reprojection to derive the predicted new view from the old view. Reprojection is also found in other image-based rendering systems, such as [McMillan, Leonard, and Gary Bishop. Plenoptic Modeling: An Image-Based Rendering System, Proceedings of SIGGRAPH 95, (Los Angeles, Calif.), Aug. 6–11, 1995, pp. 39–46, incorporated by reference herein]. (See [Kang, Sing Bing. A Survey of Image-Based Rendering Techniques. Technical Report 97/4. Digital Equipment Corporation Cambridge Research Laboratory, August 1997, incorporated by reference herein] for a survey of image-based rendering techniques).

[Mark, William R. and Gary Bishop. Efficient Reconstruction Techniques for Post-Rendering 3D Image Warping, UNC Computer Science Technical Report TR98-011, University of North Caroline, Mar. 21, 1998, incorporated by reference herein] and [Regan, M., and R. Pose, "Priority Rendering with a Virtual Reality Address Recalculation Pipeline," Computer Graphics (SIGGRAPH 94 Conference Proceedings), 1994, incorporated by reference herein] use an image-based rendering approach to overcome high network latencies. The idea in these systems is to send image-based views once approximately every five frames, and let the client reproject for the intermediate frames. The system of the present invention, on the other hand, sends an image every frame, but attempts to lower bandwidth by reducing the amount of data sent for each frame. Hence, the system relies on a low-latency network, whereas [Mark, William R. and Gary Bishop. Efficient Reconstruction Techniques for Post-Rendering 3D Image Warping, UNC Computer Science Technical Report TR98-011, University of North Caroline, Mar. 21, 1998, incorporated by reference herein] can deal with network lag, though there will begin to be some degradation in the images (when the user moves to views that are not visible to the reference images sent by the server). An integration these two approaches would be of interest.

The system of the present invention reduces bandwidth requirements by using compression. The ImageServer software [Live Picture, Inc., http://www.livepicture.com/. incorporated by reference herein] also reduces network bandwidth requirements by using compression. It sends subimages or subpanoramas on demand, and provides a view-based approach for remote panoramas. However, the system does not support image differencing or real-time frame rates.

QuickTime VR 2.1 [Apple Computer, Inc., http://www.apple/com/quicktime, incorporated by reference herein] and the QuickTime Plug-In introduce streaming QTVR movies: QTVR movies which begin to appear as soon as they begin to download. This is accomplished with low-resolution preview tracks and by reordering the data in the movie so the tiles (for panoramas) or views (for objects) can be displayed as they are downloaded.

The view-based, cached approach can be though of as an image compression scheme, based on specialized a prior knowledge of the image properties. Compare, for example, the multiscale compression schemes [Burt, Peter, Adelson, Edward. The Laplacian pyramid as a compact image code. IEEE Transactions on Communications, 31(4):532–540, April 1983, incorporated by reference herein] and [Sweldens, Wim. The lifting scheme: A custom-design construction of biorthogonal wavelets, Technical Paper 1994:7, Industrial Mathematics Initiative, Department of Mathematics, University of South Carolina, 1994, incorporated by reference herein] which use prediction and difference. Our work enhances this with a cooperative client-server approach, similar to [Levoy, Marc. Polygon-Assisted JPEG and MPEG Compression of Synthetic Images. SIGGRAPH 95, http://graphics.stanford.edu/papers/poly, incorporated by reference herein].

SUMMARY OF THE INVENTION

The present invention pertains to a system for viewing a scene from a remote location. The system comprises a client machine. The system comprises a network connected to the client machine. The system comprises a server machine having a 3D environment stored in it. The server machine is connected to the network and remote from the client machine, wherein the client machine predicts a next view of the 3D environment based on a previous view of the 3D environment by the client machine, and the server machine predicts the next view also based on the previous view and sends to the client machine by way of the network only the difference between the predicted view and the previous view.

The present invention pertains to a method for viewing a scene from a remote location. The method comprises the steps of waiting for a mouse event signaling a view change. Then there is the step of sending a message to a server over a network from a client indicating previous and new view orientations. Next there is the step of reading a difference image from the server. Then there is the step of capturing a previous view. Then there is the step of drawing an old view into a new orientation. Next there is the step of blending in the difference image from the server over the new orientation.

The present invention pertains to a method for viewing a scene from a remote location. The method comprises the steps of waiting for a message from a client giving previous and new view orientations. Then there is the step of drawing a environment map at the previous view orientation. Next there is the step of capturing the previous view. Then there is the step of aligning the old view with a new view. Next there is the step of capturing the new view. Then there is the step of drawing an environment map at the new view orientation. Next there is the step of computing a difference image between the old view and the new view. Then there is the step of transmitting a difference image to the client. Next there is the step of forming the new view at the client based on the previous view and the difference image.

The present invention pertains to a system for creating a remote view of a panoramic scene. It utilizes dynamic image differencing, compression, image reprojection and a stateless communication protocol to reduce bandwidth requirements. The approach can be generalized to handle remote views of 3D scenes (by transmitting color and depth buffer values). This technique could be used to create multiple interactive views of dynamic 3D spaces which are rendered using a high performance 3D server (such as an Onyx Infinite Reality system) and are displayed using high frame rates, with low latency, and moderate bandwidth on desktop graphics platforms. The current implementation handles only static scenes using a cylindrical projection.

BRIEF DESCRIPTION OF THE DRAWINGS

In the accompanying drawings, the preferred embodiment of the invention and preferred methods of practicing the invention are illustrated in which.

DETAILED DESCRIPTION

Figure 4:
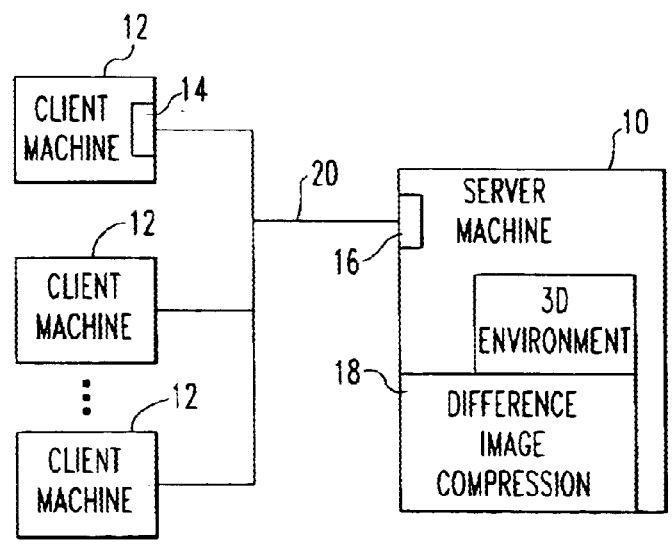
FIG. 4 is a schematic representation of the system of the present invention.

Referring now to the drawings wherein like reference numerals refer to similar or identical parts throughout the several views, and more specifically to FIG. 4 thereof, there is shown a system for viewing a scene from a remote location. The system comprises a client 12 machine. The system comprises a network 20 connected to the client 12 machine. The system comprises a server 10 machine having a 3D environment stored in it. The server 10 machine is connected to the network 20 and remote from the client 12 machine, wherein the client 12 machine predicts a next view of the 3D environment based on a previous view of the 3D environment by the client 12 machine, and the server 10 machine predicts the next view also based on the previous view and sends to the client 12 machine by way of the network 20 only the difference between the predicted view and the previous view.

Preferably, the client 12 machine sends a request for a desired view by sending coordinates of the desired view and the coordinates of the previous view to the server 10 machine. The client 12 machine and the server 10 machine preferably perform identical viewing processes. Preferably, the client 12 machine and the server 10 machine carry out projection computations dynamically.

The present invention pertains to a method for viewing a scene from a remote location. The method comprises the steps of waiting for an update request event, such as a mouse event signaling a view change. Then there is the step of sending a message to a server 10 over a network 20 from a client 12 indicating previous and new view orientations. Next there is the step of reading a difference image from the server 10. Then there is the step of capturing a previous view. Then there is the step of drawing an old view into a new orientation. Next there is the step of blending in the difference image from the server 10 over the new orientation. Preferably, the drawing step includes the step of drawing the previous view as a texture mapped square rotated to the new orientation.

The present invention pertains to a method for viewing a scene from a remote location. The method comprises the steps of waiting for a message from a client 12 giving previous and new view orientations. Then there is the step of drawing a environment map at the previous view orientation. Next there is the step of capturing the previous view. Then there is the step of aligning the old view with a new view. Next there is the step of capturing the new view. Then there is the step of drawing an environment map at the new view orientation. Next there is the step of computing a difference image between the old view and the new view. Then there is the step of transmitting a difference image to the client 12. Next there is the step of forming the new view at the client 12 based on the previous view and the difference image.

Preferably, the aligning step includes the step of aligning the previous view with the new view by rotation to the new orientation. The capturing the previous view step preferably includes the step of capturing the rotated version of the previous view. Preferably, the computing step includes the step of computing the difference image between the rotated previous view and the new view.

In the operation of the preferred embodiment, a set of techniques is provided for very low bandwidth navigation of remote environments. In a typical setup, a virtual environment resides on a server 10 machine, and one or more users explore the environment from client 12 machines. Each client 12 uses previous views of the environment to predict the next view, using the known camera motion and image-based rendering techniques. The server 10 performs the same prediction, and sends only the difference between the predicted and actual view. Compressed difference images require significantly less bandwidth than the compressed images of each frame, and thus can yield much higher frame rates. To request a view, the client 12 simply sends the coordinates of the desired view and the previous view to the server 10. This avoids the overhead of maintaining connections between the server 10 and each client 12.

No restrictions are placed on the scene or the camera motions; the compression technique may be used with arbitrarily complex 3D scenes or dynamically changing views from a web camera or a digital television broadcast. For dynamically-changing scenes, the server 10 caches prior views. An approximate depth map is required for camera translation. Better compression will be achieved for static, Lambertian scene elements.

This work should be of interest to anyone interested in remote exploration of virtual worlds such as on head-mounted displays, Digital Television, or over the Internet.

The new remote navigation approach is described in detail. The system allows a user, on a client 12 machine, to interactively explore a 3D environment stored on a remote machine (the server 10). The client 12 and server 10 are connected by a network 20. Operation begins when the server 10 sends the image of the view from a user's starting location in the 3D world.

The server can also track the current view seen by each client; this makes the system state-based. In this variation, the server computes a difference image by comparing the client's predicted view and the correct view. In this system, no degradation of the client's view can occur over time, because the server precisely corrects that occur on the client side in each frame.

Figure 1:
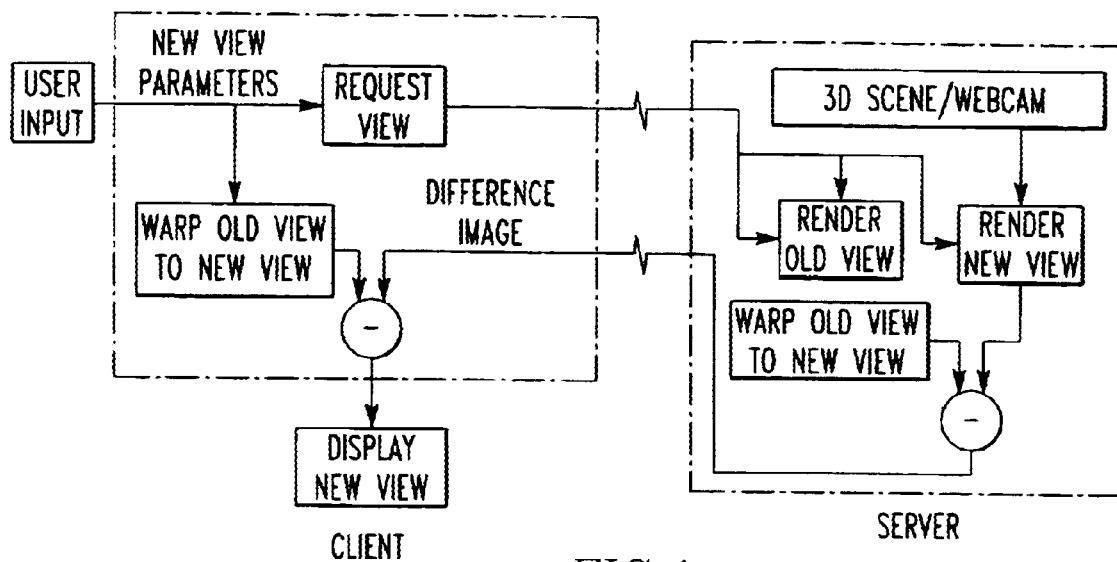
FIG. 1 is a flow chart for viewing compression for remote navigation.

The operation of the system is illustrated in FIG. 1. At each frame, the client 12 system requests the view from the current camera position, orientation, and focal length, by sending the coordinates of the requested view $V_1$ and the coordinates of the current view $V_0$. While waiting for a response, the client 12 predicts the appearance of the new view, by reprojecting the old view to the new view. In the presence of network 20 latency, predicted views can also be used to show intermediate frames [William R. Mark, Leonard McMillan, Gary Bishop. Post-Rendering 3D Warping. *Proceedings of the* 1997 *Symposium on Interactive 3D Graphics* (Providence, R.I.), Apr. 27–30, 1997, p7–16, incorporated by reference herein].

The server 10 renders both views $V_0$ and $V_1$, reprojects $V_0$ to $V_1$, and computes the difference between the actual and predicted view. The difference range is then sent back to the client 12. The client 12 then reconstructs the actual view by summing the prediction and the difference image.

A depth map is required for 3D reprojection. The same prediction/difference scheme is used for depth maps: the client 12 predicts the depth map for a new view by transferring the current depth map, and a difference image is sent by the server 10. Since depth maps are usually smooth (except at object contours), their bandwidth requirements can be reduced by subsampling.

The key observation is that previous views may be used to accurately predict new views. Ideally, the prediction will exactly match the new view in regions visible from the current view. (In practice, small errors are introduced by sampling artifacts and changes to the underlying scene.) Thus, the difference image will be highly compressible, requiring much less bandwidth than sending each new view in its entirety.

Each new request contains all the necessary information for the server 10 to create difference images. Thus, the system is stateless: it is not necessary to maintain dedicated connections between server 10 and clients 12, nor does the server 10 need to keep track of each client's history. This allows the system to scale to arbitrary numbers of clients, limited only by available network 20 resources.

The central operation of image-based rendering is "reprojection," where a sampled view of a 3D world is used to generate another view. If the views differ only in camera direction, then the operation is equivalent to environment mapping [Ned Greene. Environment mapping and other applications of world projection. *IEEE Computer Graphics & Applications*. 6(11):21–29, incorporated by reference herein]. If the camera position moves, then additional depth or correspondence information is required [Leonard McMillan, Gary Bishop. Plenoptic modeling: an image-based rendering system. *SIGGRAPH* 95, (August 1995), p39–46, incorporated by reference herein], [Shai Avidan, Amnon Shashua. Novel View Synthesis in Tensor Space. *IEEE Computer Vision and Pattern Recognition*, June 1997, incorporated by reference herein], and there may be ambiguities in the result. Different images are used to correct these ambiguities.

Reprojection is implemented using a standard 3D computer graphics library [Mason Woo, Jackie Neider, Tom Davis. *OpenGL Programming Guide, Second Edition*. Addison-Wesley, 1997, incorporated by reference herein]. Camera rotation without translation is performed by texturing the previous view onto a rectangle coinciding with the old view plane, and then rotating the camera. Camera translation requires additional depth information. The current view is placed on a textured depth mesh [Lucia Darsa, Bruno Costa, and Amitabh Varshney. Navigating Static Environments Using Image-Space Simplification and Morphing. *ACM Symposium on Interactive 3D Graphics*, Providence, R.I., 1997, pp. 25–34; Francois Sillion, George Drettakis, and Benoit Bodelet. Efficient Impostor Manipulation for Real-Time Visualization of Urban Scenery. Computer Graphics Forum (Proc. of Eurographics '97). September, 1997. p207–218, both of which are incorporated by reference herein], a mesh that represents the current view as a height field with the correct depth. To reproject, the camera is rotated and translated, and the mesh is rendered. The depth mesh may be approximate, or subsampled; again, any errors in the prediction will be corrected by the difference image.

An initial prototype of a client-server system for remotely viewing panoramas over a network 20 has been implemented. The system combines image reprojection, panorama viewing, data compression and network. 20 communication protocols to deliver a real-time network 20 based panorama viewer. The long-term goal of the project is to create a stateless server 10 for efficiently viewing very large/high detail image panoramas over low-latency moderate bandwidth networks.

The panorama, potentially a very large image or 3D model, resides in the panorama server 10. A client 12 begins by requesting the view for its initial view position. The server 10 projects that view and sends it to the client 12 to be displayed. When the client 12 wants new views, the system can exploit coherence between frames to avoid sending an entire image over the network 20 for each frame. The idea is that the client 12 will reproject its old view to the new view direction to predict what that view will look like. At the same time, the client 12 sends a request containing the old view position and the new view position. The server 10 will use this request to compute the same reprojection as the client 12, and will send over a difference image, containing the pixelwise differences between the client's predicted view and the actual. Since large portions of the difference image will contain small magnitudes or zero, there are considerable opportunities for compression to minimize the size of the image sent over the network 20. Likewise, since the client's request contains all of the information necessary to send over the difference image, the server 10 can be stateless, meaning that it does not need to remember anything about the clients from frame to frame.

A system has been implemented which supports cylindrical panoramas with two degrees of freedom (an horizontal rotation, Theta, and a vertical rotation, Phi). The system comprises:

A Panorama server 10—Cylinder-to-planar reprojection

A Panorama client 12—Planar-to-planar reprojection

An Interactive panorama viewer (client interface 14)

A Server-client network interface 16

Difference image compression 18

One implementation challenge of a View-based system utilizing difference images is that the client 12 and the server 10 must use identical viewing processes, or the difference images will be wrong and artifacts will become visible. These artifacts can also get exaggerated over successive view transformations. For this reason, care must be taken while implementing the reprojection system.

Another implementation challenge is that the server 10 and client 12 must carry out projection computations and image compression/decompression dynamically. Graphics hardware can be used to accelerate these tasks, making the approach feasible on modern computers.

The client 12 and server 10 are implemented using OpenGL and Toogl (A Tcl interface to OpenGL). OpenGL texture mapping is used to perform reprojection. Tcl is used for user interface components and for network 20 communication.

The current implementation proceeds as follows:
Client Side:
1. wait for mouse event signaling a view change
2. send message to server 10 indicating old and new view orientations
3. read difference image from server 10
4. capture old view
5. draw old view as texture mapped square rotated to new orientation
6. blend in difference image from server 10 over rotated old view Server Side:
1. wait for message from a client 12 giving old and new view orientations
2. draw environment map at old view orientation
3. capture old view
4. align old view with new view (by rotation to new orientation)

5. capture rotated version of old view
6. draw environment map at new view orientation
7. capture new view
8. compute difference image between rotated old view and new view
9. transmit difference image to client 12

Note that the client 12 could be improved by moving step 3 to be after step 5—i.e. interleaving the client 12 and server 10 projection activities, thereby allowing the client 12 to carry out its projection task while waiting for the server 10 to do its work. Timing results indicate that this would yield an estimated 5%–10% increase in speed.

When transmitting the difference image from the server 10 to the client 12, the image is compressed using a simple run-length encoding scheme, as follows:

For each pixel in the new image:
  if the pixel is unchanged between the new image and the rotated old image, then increment a counter.
  otherwise
    if the counter is non-zero, transmit an escape code followed by the value of the counter, and reset the counter.
    transmit the RGB pixel value.

Decoding is simple:
  read a byte.
  if it is the escape code, read a run length, and copy the specified number of pixels from the old image into the new image.
  otherwise, read another two bytes, compose the data into a RGB pixel, and copy pixel value into the new image.

This scheme compresses continuous regions of the image that are unchanged. To determine if a pixel is "unchanged" between the rotated old image and the new image, we compute the L1 norm of the difference of the two RGB pixels, and compare it to a threshold value T, (The L1 norm was chosen for efficiency), i.e. pixels are treated the same if:

$$|r-or|-|g-og|+|b-ob|<=T$$

This improves compression rates, although it introduces small errors into the resulting image. Threshold values beneath 5% produce reasonable compression rates and the error levels are acceptable.

The compression algorithm is simple and fast. Better compression schemes could be implemented, though these would probably take longer to compute and might therefore not be effective in increasing frame rates.

Figure 2:
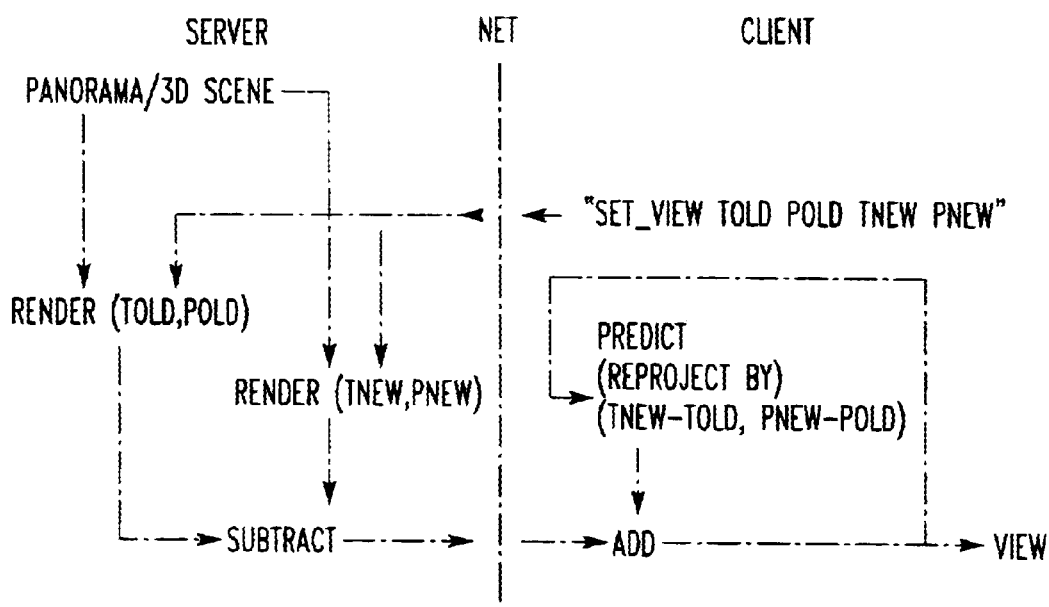
FIG. 2 is a block diagram of the protocol of the present invention.
Figure 3:
FIG. 3 is an environment map.

In regard to networking, TCP/IP is used to perform client/server communication. The protocol is stateless, and consists of just two messages:

(Client→Server) SET_VIEW oldTheta oldPhi newTheta newPhi
  (Response) RESULT differenceImage This protocol is illustrated in the block diagram of FIG. 2.

Because the communication protocol is simple and stateless, in the long term a faster UDP-based implementation would be relatively straightforward.

Several timing and quality tests have been carried out on this system. See the following for more details:

Timing
Frame rates at various image sizes and compression ratios
Breakdown of time spent each frame
Image Size and Quality
Compression of Difference Image
Error Propagation in Sequence of Views All experiments use the environment map shown in FIGS. 3 and 5–11 (shown at half size):

The system performs in near real time with window sizes of 128×128 on SGI O2 platforms connected using Ethernet. With optimization and tuning, the algorithm could be improved to support rates of 15 fps at a larger window size.

The time to read and write the image over the network 20 is a dominating factor determining frame rates. This time depends strongly on the size of the encoded difference image, and thus on the image compression. Better image compression would yield faster overall performance.

Some of the Optimizations Areas are:
Switching to UDP-based instead of TCP-based communication.
Optimizing the compression/projection code, including unrolling loops, switching to faster GL functions, etc.
Implementing a better compression algorithm for the difference image, e.g. switching from a RGB color space to a perceptual color space.
Utilizing hardware for image differencing and compression.
Interleaving the client and server projection workload.
Utilizing adaptive compression to achieve a fixed frame rate.

A stateless, low-bandwidth method for remote environment navigation has been demonstrated. A client 12 system is used to explore an environment contained on a server 10 system. During navigation, the client 12 can predict new views by reprojecting old views, using the known camera motion and image-based rendering techniques. The server 10 system needs only to send the difference between the prediction and the actual view. Since the difference image is highly compressible, the system requires relatively little bandwidth. It is assumed that both systems are fast enough to perform rendering and differencing in real-time, and that the primary bottleneck is in the intervening network 20.

An alternative approach to the view-based compression is to send pieces of an underlying image-based model. In the case of panorama navigation, the client 12 requests pieces of the environment map, rather than views, and stores them in a cache. This method has the advantage that the client 12 can predict views based on all previous views, not just the last view. However, extending this method to full 3D navigation or to dynamically-changing scenes may require considerable bookkeeping effort.

The technique can be extended to give fine control over quality of service. Difference images can be compressed lossily to increase performance. This can cause errors to build up when the user dwells in once part of the virtual space. To correct this, the client 12 can keep track of the image error and request a complete refresh before the errors become noticeable. In a state-based system, the server 10 can keep precise track of errors, and prevent them from ever building up by correcting them at each frame.

There are many possible avenues for further research and development, including:
Extending the system to support zooming and translation.
Adapting the system to work with 3D navigable scenes.
Include support for dynamically changing scenes.
Investigating approach 3, Model-based, cached. Possible applications for these techniques include:
  Web-based scene browsing
  Telepresence/Remote navigation of real-world scenes
  Navigation of complex, 3D multiuser worlds It should be noted that the Image Compression parameter T is the threshold parameter used for the runlength image encoding. A threshold value of None corresponds to encoding the complete image without any compression. A threshold of 10 uses a lossless compression scheme where only identical pixels are run-length encoded. Higher threshold values are lossy, but have greater compression. Also, some projection steps of client and server could be interleaved to speed things up further.

Example: Difference Images

This example discusses thresholding and compressing the difference images. The accuracy of the difference is compared and the compression rate achieved is studied by the run-length encoding scheme.

For the example, the view on a 444×444 pixel square (in a 512×512 window) was rendered. The transformation between the views is a rotation around the y-axis of 5 degree.

The size of the difference image using the geometry of the projection system is calculated. For this specific transformation the difference image is about 12% (=0.12×3×444× 444 byte=70 kb) of a complete view.

Figure 5:
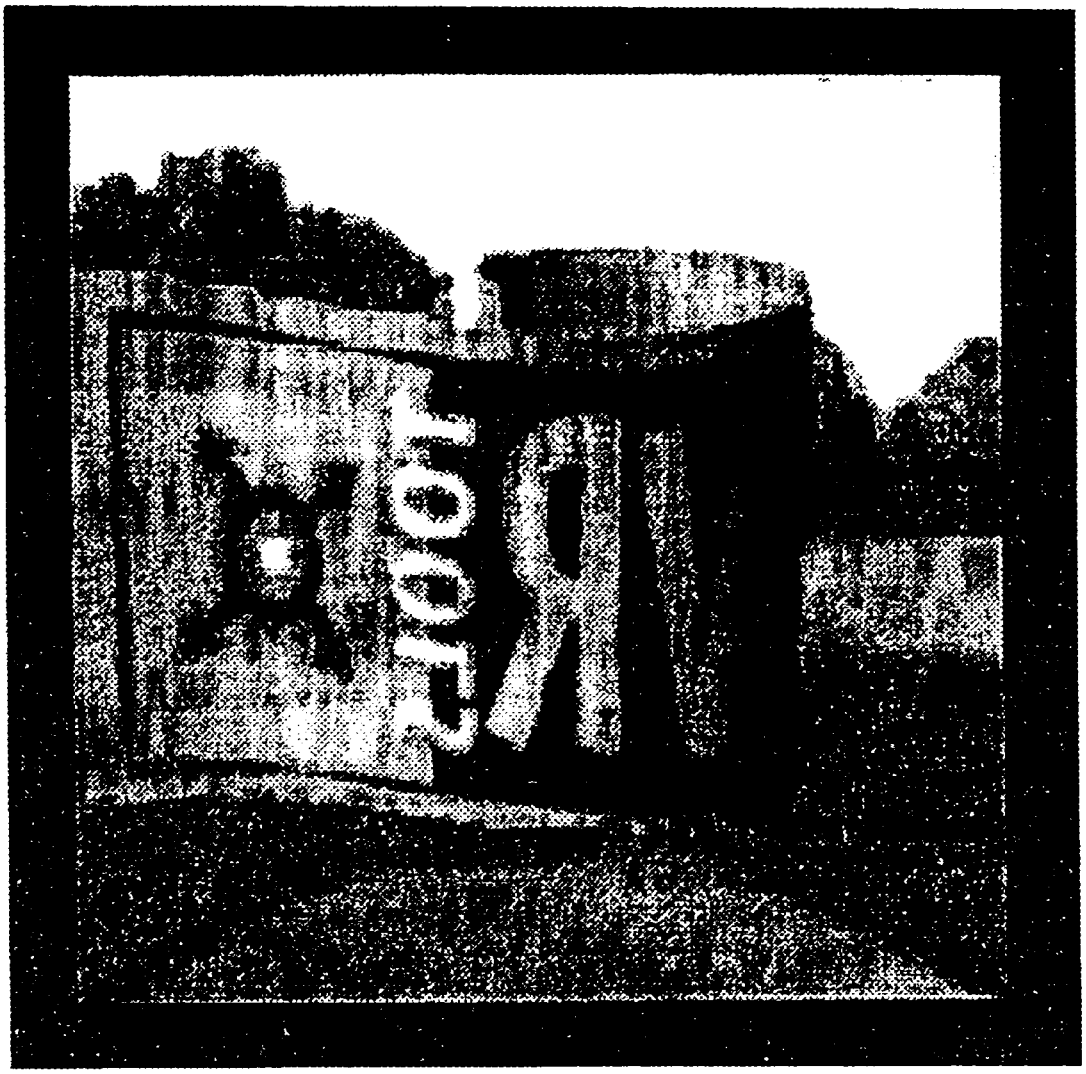
FIG. 5 is a view of T=−1, size=768 Kb.

FIG. 5 shows the complete view without any differencing (since the pixel difference is always above the threshold T=−1—no compression). The image size is 512×512×3 byte=768 kb, but an only area of size 444×444×3 byte=578 kb effectively is being used.

Figure 6:
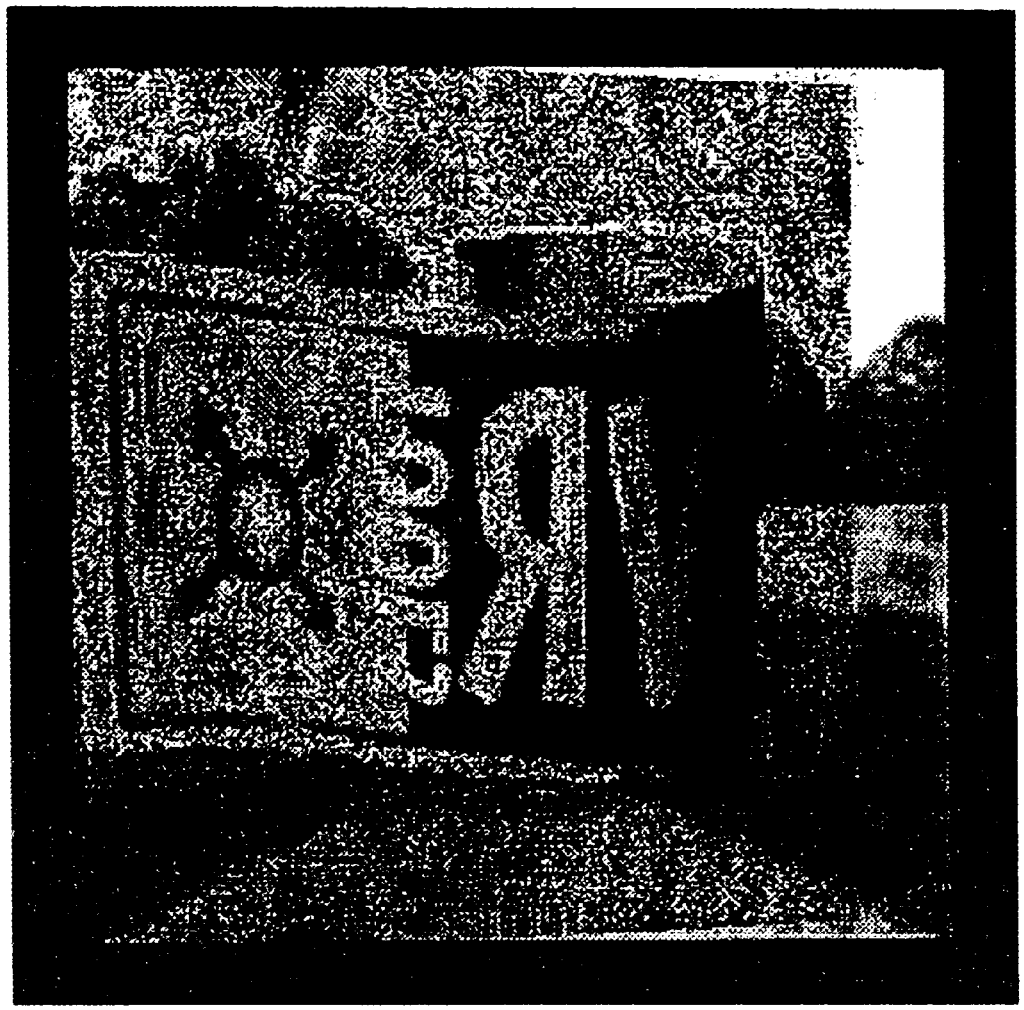
FIG. 6 is a view of T=−0, size=427 Kb and compression ratio=0.74.

FIG. 6 shows the threshold parameter T=0 corresponds to lossless compression. This exact difference image is more than 6 times as big as derived in initial calculations.

Figure 7:
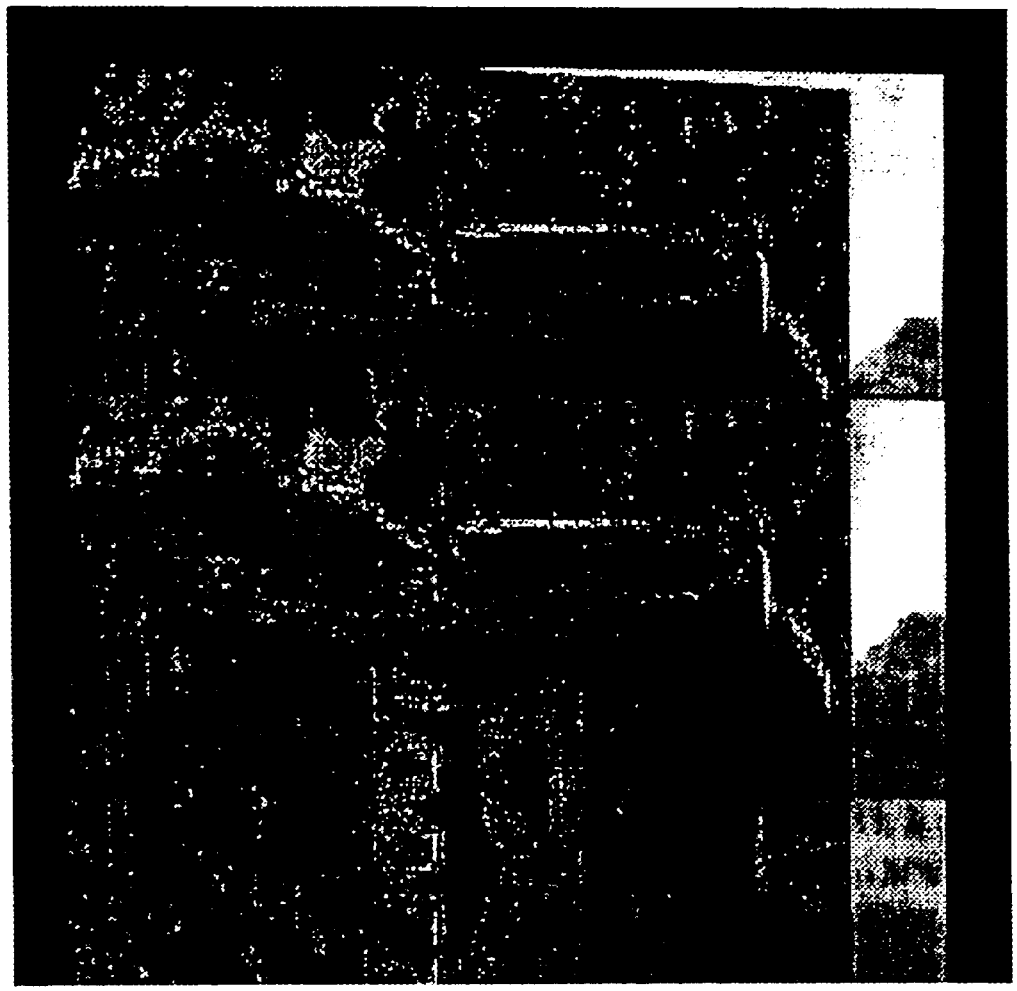
FIG. 7 is a view of T=−20, size=92 Kb and compression ratio=0.16.

With respect to FIG. 7, it is expected the difference image is a narrow stripe on the right and tiny triangles on the top and bottom. The noisy rest of the image would appear black in an ideal case. Some artifacts due to the reprojection process are expected. The pattern in the artifacts indicate aliasing.

With respect to FIG. 7, a threshold of T=20 helps to get rid of a significant part of the artifacts, but doesn't seem to influence the stripe on the right too much. It can be seen in the following figures that T needs to be much higher to create serious artifacts in this area (i.e. T=100). With respect to FIG. 8, the thresholding allows a compression ratio of 16%, which is close to the derived ratio of 12%.

Figure 8:
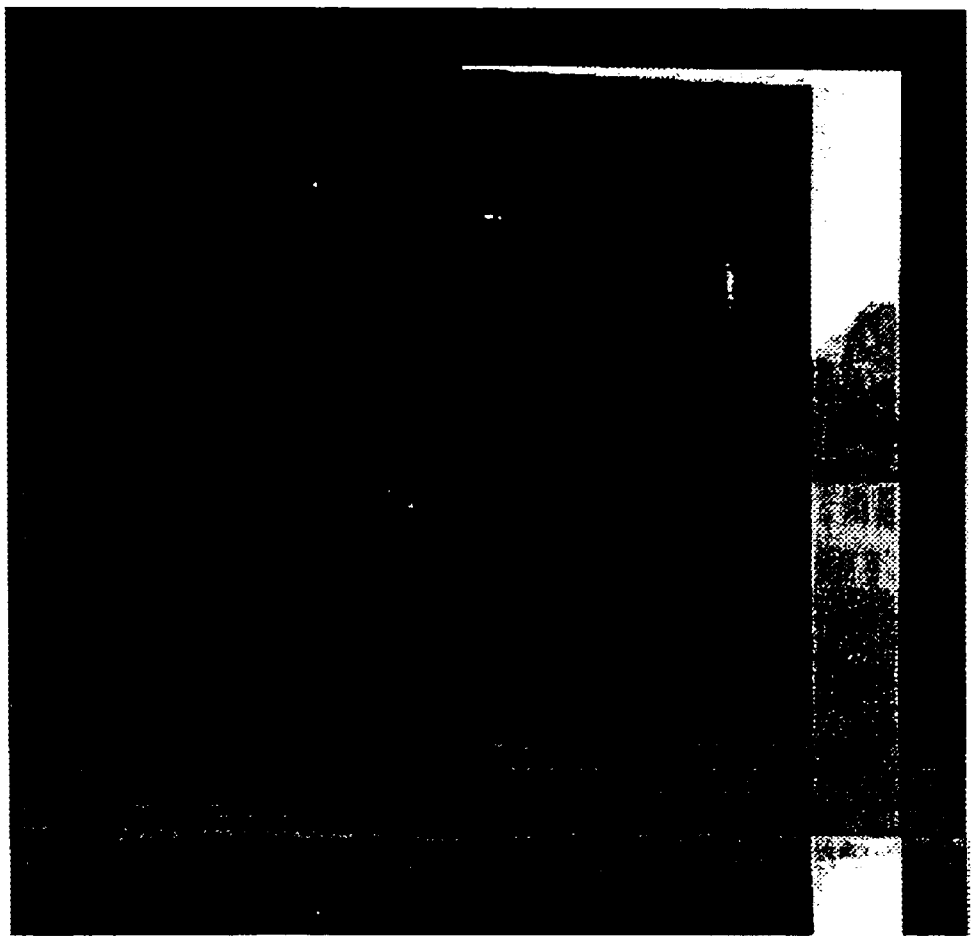
FIG. 8 is a view of T=−50, size=67 Kb and compression ratio=0.12.

With respect to FIG. 8, almost all artifacts choosing the threshold of T=50 can be eliminated, and get close to derived compression ratio. However, significant problems in the stripe on the right might be introduced.

Figure 9:
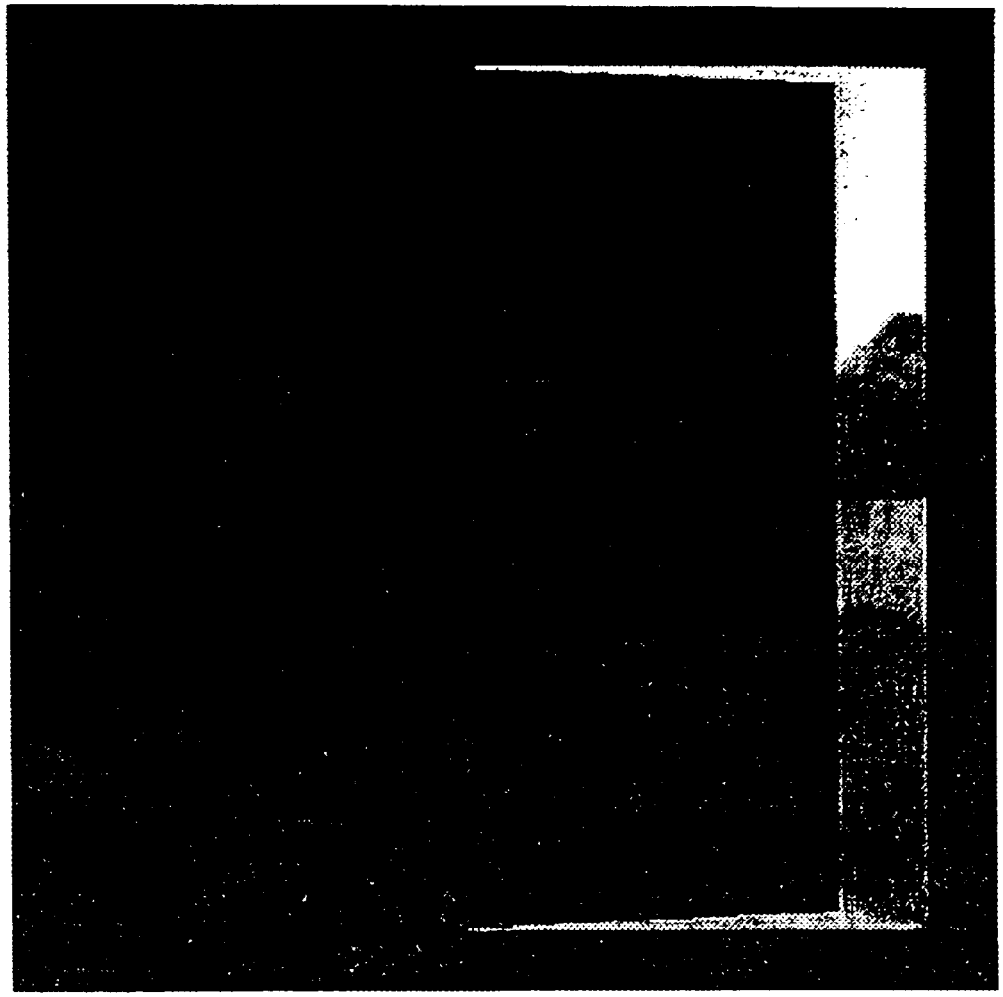
FIG. 9 is a view of T=−100, size=65 Kb and compression ratio=0.11.

With respect to FIG. 9, the high threshold value T=100 compresses the image more than desired: the compression ratio drops below the theoretically derived possible ratio. These problems become apparent in the missing pixels of the image.

Figure 10:
FIG. 10 is a difference image of a view.
Figure 11:
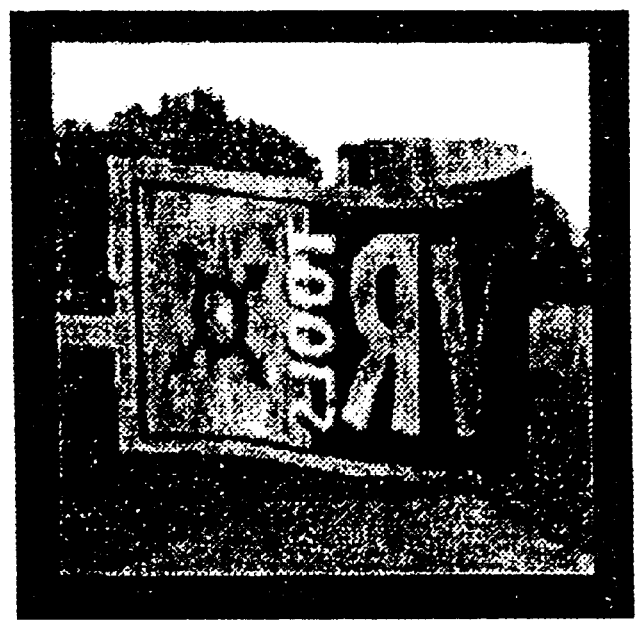
FIG. 11 is a difference image of a "black" view.

Another example shows the effect of artifacts caused by thresholding. The following FIGS. 10 and 11 are difference images of a view and a "black" view, respectively. The high threshold value causes the dark pixels to disappear.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A system for viewing a scene from a remote location comprising:
   a client machine;
   a network connected to the client machine; and
   a server machine having a 3D environment stored in it, the server machine connected to the network and remote from the client machine, wherein the client machine predicts a next view of the 3D environment based on a previous view of the 3D environment by the client machine, and the server machine predicts the next view also based on the previous view and sends to the client machine by way of the network only the difference between the predicted view and the previous view.

2. A system as described in claim 1 wherein the client machine sends a request for a desired view by sending coordinates of the desired view and the coordinates of the previous view to the server machine.

3. A system as described in claim 2 wherein the client machine and the server machine perform identical viewing processes.

4. A system as described in claim 3 wherein the client machine and the server machine carry out projection computations dynamically.

5. A method for viewing a scene from a remote location comprising the steps of:
   waiting for an update request event mouse event signaling a view change;
   sending a message to a server over a network from a client indicating previous and new view orientations;
   reading a difference image from the server;
   capturing a previous view;
   drawing an old view into a new orientation; and
   blending in the difference image from the server over the new orientation.

6. A method as described in claim 5 wherein the drawing step includes the step of drawing the previous view as a texture mapped square rotated to the new orientation.

7. A method as described in claim 6 wherein the update request event includes a mouse event.

8. A method for viewing a scene from a remote location comprising the steps of:
   waiting for a message from a client giving previous and new view orientations;
   drawing a environment map at the previous view orientation;
   capturing the previous view;
   aligning the old view with a new view;
   capturing the new view;
   drawing a environment map at the new view orientation;
   computing a difference image between the old view and the new view;
   transmitting a difference image to the client; and
   forming the new view at the client based on the previous view and the difference image.

9. A method as described in claim 8 wherein the aligning step includes the step of aligning the previous view with the new view by rotation to the new orientation.

10. A method as described in claim 9 wherein the capturing the previous view step includes the step of capturing the rotated version of the previous view.

11. A method as described in claim 10 wherein the computing step includes the step of computing the difference image between the rotated previous view and the new view.

* * * * *